United States Patent [19]

Yamaji et al.

[11] 4,417,754
[45] Nov. 29, 1983

[54] PIPE JOINT FOR PREVENTING SEPARATION

[75] Inventors: Tadao Yamaji, Ashiya; Toshi Nakajima, Kobe; Takeshi Kashi, Amagasaki, all of Japan

[73] Assignee: Kubota, Ltd., Osaka, Japan

[21] Appl. No.: 369,115

[22] Filed: Apr. 16, 1982

[30] Foreign Application Priority Data

Sep. 30, 1981 [JP] Japan .................. 56-146274

[51] Int. Cl.³ ............................................. F16L 21/02
[52] U.S. Cl. .................................... 285/104; 285/321; 285/337; 285/374; 285/404
[58] Field of Search ............... 285/104, 105, 374, 337, 285/404, 321

[56] References Cited

U.S. PATENT DOCUMENTS

| | | | |
|---|---|---|---|
| 1,898,623 | 2/1933 | Gammeter | 285/104 X |
| 3,726,549 | 4/1973 | Bradley, Jr. | 285/374 X |
| 3,920,270 | 11/1975 | Babb, Jr. | 285/104 |
| 4,092,036 | 5/1978 | Sato et al. | 285/374 X |
| 4,127,290 | 11/1978 | Mutschlechner | 285/374 X |
| 4,194,769 | 3/1980 | Bram | 285/374 X |

FOREIGN PATENT DOCUMENTS

| | | | |
|---|---|---|---|
| 1300078 | 6/1962 | France | 285/104 |
| 55-31338 | 7/1980 | Japan | |
| 970887 | 9/1964 | United Kingdom | 285/104 |

Primary Examiner—Thomas F. Callaghan
Attorney, Agent, or Firm—Joseph W. Farley

[57] ABSTRACT

A pipe joint for preventing separation comprising a holding member connectable to an annular outer flange formed at the end of a socket and surrounding the outer periphery of a spigot outside the socket, the holding member being annular or being adapted to form an annular shape, the holding member being provided on its inner periphery with a tapered surface increasing in diameter toward the socket; a stopper in the form of a ring divided at one portion and provided with an outer peripheral tapered surface increasing in diameter toward the socket and with engaging edges in circumferential rows on its inner periphery, the stopper being interposed between the tapered surface of the holding member and the spigot outer periphery; and tap bolts extending through the holding member at suitable portions along its circumference for pressing the stopper from outside against the spigot outer periphery. Because the stopper is thus shaped, the joint is easy to assemble and manufacture. When the spigot acts to slip off with the tap bolts tightened up, a diametrically constricting force acts on the spigot uniformly circumferentially thereof without any unevenness to reliably prevent separation of the spigot from the socket.

8 Claims, 9 Drawing Figures

PIPE JOINT FOR PREVENTING SEPARATION

The present invention relates to pipe joints chiefly for pipes of relatively small diameters, and more particularly to a separation preventing pipe joint having means provided outside a socket for preventing a spigot from slipping off the socket.

Pipe joints for water supply pipelines, etc. include those wherein a pressing ring is pressed against an annular packing provided between a packing seat on the inner periphery of the open end of a socket and the outer periphery of a spigot to seal off the connection between the socket and the spigot. With joints of this type, the spigot is likely to slip off the joint, for example when the pipeline is installed in a soft ground or is subjected to earthquake or when the joint is used for connecting pipes at an angle. Accordingly there is the need to provide some means for preventing the slipping off.

Published Examined Japanese Utility Model Application No. 55-31338 discloses a separation preventing pipe joint of the type wherein an annular packing is provided between the outer periphery of a spigot and a packing seat formed on the inner periphery of the end of a socket. The joint comprises a pressing ring bolted to an outer flange at the socket end, surrounding the spigot outer periphery outside to socket and having one end pressed against the packing; a plurality of wedges provided between the pressing ring and the spigot outer periphery and suitably arranged circumferentially thereof, each of the wedges having engaging edges on its inner surface; and tap bolts extending through the pressing ring at suitable portions along its circumference for pressing the wedges from outside against the spigot outer periphery. Since the means for preventing the spigot from slipping off, namely separation preventing means, is disposed outside the socket, the pipe joint is easier to assemble and prevents separation more effectively by the action of the wedges than those in which the separation preventing means is provided within the socket. However, because the wedges are separate and independent of one another, the disclosed joint is still cumbersome to assemble and manufacture. Further because the spigot outer periphery remains partially out of contact with the wedges and also because all the tap bolts are not uniform in fastening force, the spigot outer periphery is subjected to uneven pressure. Especially when the tap bolts are tightened up strongly to prevent separation effectively, more uneven pressure will result. If the pipe is lined with cement, cracks will then develop in the lining. In the case where the spigot is to slip off, the wedges exert greater pressure on the spigot outer periphery. Thus the inevitable uneven distribution of pressing forces eventually leads to the likelihood that the lining will separate off locally.

In view of these problems, the object of the present invention is to provide a separation preventing pipe joint which has means provided outside a socket for preventing a spigot from slipping off the socket and which is easy to assemble and capable of reliably preventing separation without entailing objections such as cracking or separation of the cement lining on the inner periphery of the spigot.

To fulfill this object, the present invention provides a pipe joint for preventing separation wherein an annular packing is provided between a packing seat formed on the inner periphery of a socket and the outer periphery of a spigot. The pipe joint comprises a holding member connectable to an annular outer flange formed at the end of the socket and surrounding the spigot outer periphery outside the socket, the holding member being annular or being adapted to form an annular shape, the holding member being provided on its inner periphery with a tapered surface having an increasing diameter toward the socket; a stopper in the form of a ring divided at one portion and provided with an outer peripheral tapered surface having an increasing diameter toward the socket and with engaging edge means in a plurality of circumferential rows on its inner periphery, the stopper being interposed between the inner peripheral tapered surface of the holding member and the spigot outer periphery; and tap bolts extending through the holding member at suitable portions along its circumference for pressing the stopper from outside against the spigot outer periphery, each of the tap bolts having a forward end face parallel to the outer peripheral tapered surface of the stopper.

According to the construction described above, the stopper is in the form of a ring divided at one portion (i.e. having circumferentially opposed ends), so that the joint is easy to assemble, while the spigot will not be subjected to uneven pressure even if the tap bolts are tightened up strongly unlike the conventional joint. This eliminates problems, such as separation of the lining. Further the uniform engagement of the engaging edge means with the spigot outer periphery accomplished by tightening up the tap bolts strongly can be effected more tightly by the stopper which exerts a wedging action when the spigot is to slip off. Within the limits of the strength of the holding member, therefore, it is almost unlikely that the spigot will separate from the socket.

According to an embodiment of the invention, the packing seat is formed on the inner periphery of the socket end, and the holding member is an annular pressing ring connected at suitable portions along its circumference to the outer flange at the socket end by fastening members, whereby the end of the pressing ring opposed to the socket is pressed against the packing.

According to another embodiment of the invention, the packing seat is positioned at a distance from the open end face of the socket, and the holding member comprises a plurality of circular arc housings connected together in the form of an annular ring by bolts and each having a hood portion engageable with the outer flange at the socket end.

Various features and advantages of the present invention will become apparent from the following description of embodiments given with reference to the accompanying drawings, in which.

Figure 1:
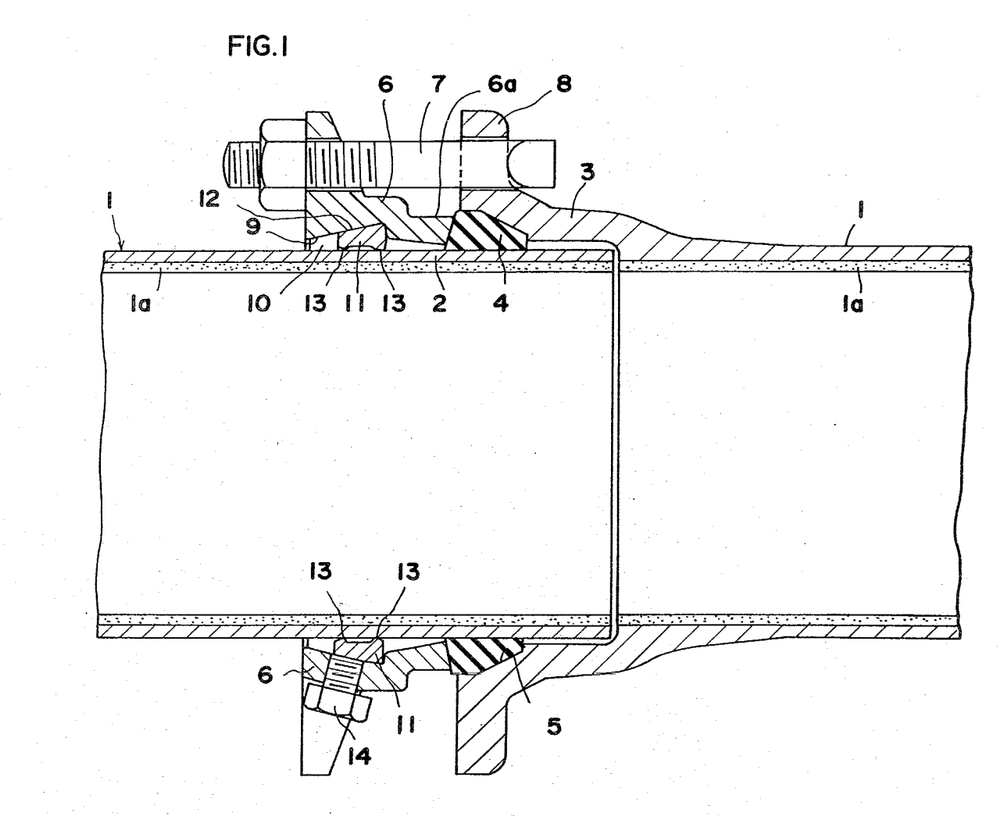
FIG. 1 is a side elevation in longitudinal section showing a pipe joint according to a first embodiment of the invention.

With reference to FIG. 1, two pipes 1 are provided with a cement lining 1a. One of the pipes has a spigot 2, which is inserted into the socket 3 of the other pipe for connection. An annular packing 4 made of rubber or the like is interposed between the outer periphery of the spigot 2 and a tapered packing seat 5 formed on the inner periphery of the open end of the socket 3. A pressing ring 6 for pressing the packing 4 surrounds the spigot 2 outside the socket 3. The pressing ring 6 is fastened, at portions (e.g. six portions) equidistantly spaced apart circumferentially thereof, to an outer flange 8 at the end of the socket 3 by fastening members 7, such as bolts, nuts, etc. The ring 6 has a pressing end 6a projecting toward the socket 3 for pressing the packing 4 into intimate contact with the two pipes 1. The pipe joint thus constructed connects the spigot 2 and the socket 3 together watertightly.

Figure 2:
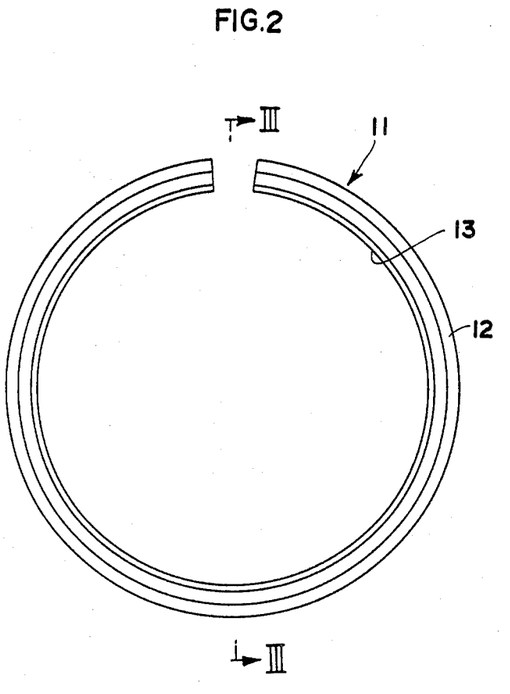
FIG. 2 is a front view showing a stopper.
Figure 3:
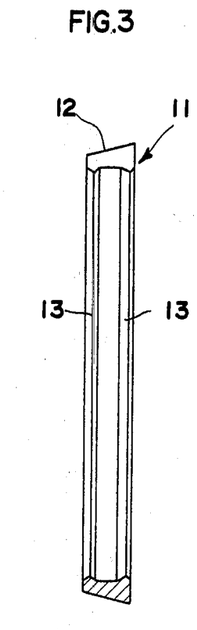
FIG. 3 is a view in section taken along the line III—III in FIG. 2.
Figure 4:
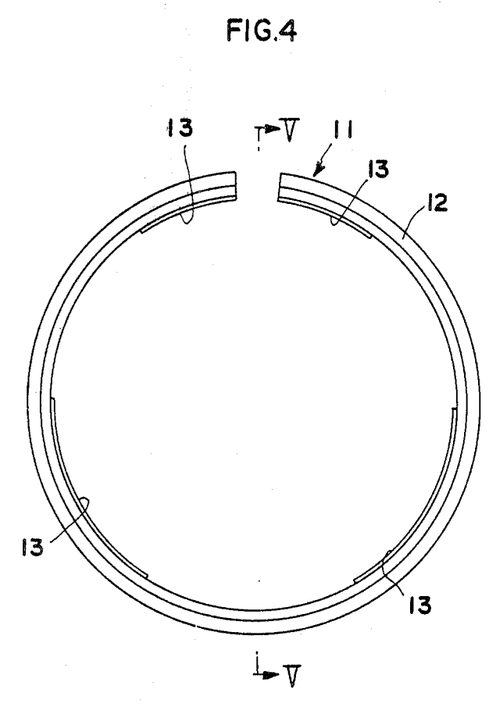
FIG. 4 is a front view showing a modification of the stopper.
Figure 5:
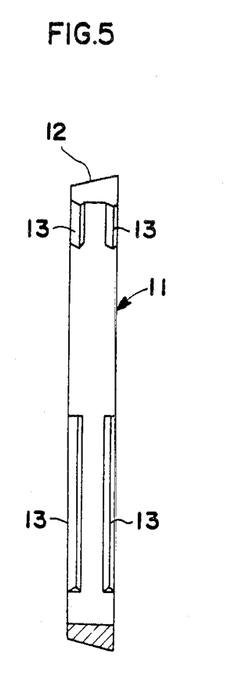
FIG. 5 is a view in section taken along the line V—V in FIG. 4.

The pressing ring 6 has on its inner periphery a tapered surface 9 having an increasing diameter toward the socket 3 and defining a circumferentially continuous annular recess 10 to form a stepped portion between the pressing end 6a and the other end of the ring 6. Fitted in the recess 10 around the outer periphery of the spigot 2 is a stopper 11 which is an integral ring divided at one portion as shown in FIGS. 2 and 4. The stopper 11 has an outer peripheral surface 12 tapered in conformity with the tapered surface 9 and is provided on its inner periphery with a plurality of engaging edges 13 each extending in the form of a ridge. The engaging edge 13 extends continuously circumferentially of the stopper as seen in FIG. 3. Alternatively, engaging edges may be formed discretely circumferentially of the stopper 11 at a specified spacing as shown in FIG. 5. In either case, it is desirable to form the engaging edges 13 in two rows at axially opposite ends of the stopper 11 to effectively prevent the spigot from slipping off. Between the portions of the pressing ring 6 fastened by the fastening members 7, tap bolts 14 are screwed in and extend through the ring 6 approximately perpendicular to the tapered surface 12 of the stopper 11. When tightened up, the tap bolts 14 press the stopper 11 from outside against the spigot 2. The tap bolt 14 has a forward end face parallel to the tapered surface 12 of the stopper 11.

If the spigot 2 acts to slip off from the socket 3 to which it is connected by the joint of the above construction, the stopper 11 pressed against the outer periphery of the spigot 2 is moved by the action of the spigot 2 away from the socket 3 along the forward end faces of the tap bolts 14 and the tapered inner peripheral surface of the pressing ring 6. Consequently the stopper, acting like a wedge, is forcibly constricted diametrically, with the result that the engaging edges 13 on its inner periphery are pressed against the outer periphery of the spigot 2 under increased pressure to bite into the periphery, whereby the spigot 2 is prevented from slipping off. It may appear that the tap bolts 14, when tightened up, will separate the tapered surface 12 of the stopper 11 from the tapered surface 9 of the pressing ring 6, but an effective pressure can be obtained actually merely by causing the ends of the bolts 14 to project slightly from the tapered surface 9, so that the tapered surfaces 9 and 12 can be considered to be substantially flush with each other. Further, at the locations where the tap bolts 14 are not in pressing contact with the stopper 11, contact is assured between the tapered surfaces 9 and 12. Thus the stopper 11 produces a wedging effect over the entire periphery thereof.

Especially because the stopper 11 is an integral ring which is divided at one portion, the pressure to be exerted by the stopper 11 when the tap bolts 14 are tightened up is substantially uniform over the entire circumferential length of the stopper, while if the spigot acts to slip off as above, the stopper 11 is diametrically constricted in its entirety and pressed against the spigot as is constricting the spigot. Accordingly the pressure and therefore the engaging action, namely stopper action, by the biting of the edges 13 exerted on the spigot are approximately uniform over the entire periphery of the spigot. This enables the stopper 11 to prevent separation very effectively without the likelihood involved in the conventional joint that the spigot will be subjected to uneven pressure, for example, due to uneven fastening force. Thus the present joint achieves an outstanding separation preventing effect. Additionally because the stopper 11 in the form of a divided but integral ring will not exert a high pressure locally on the spigot 2, the cement lining 1a is free of cracking or separation.

The stopper 11 which is a divided but integral ring has another advantage that it is easy to install and and make.

Figure 6:
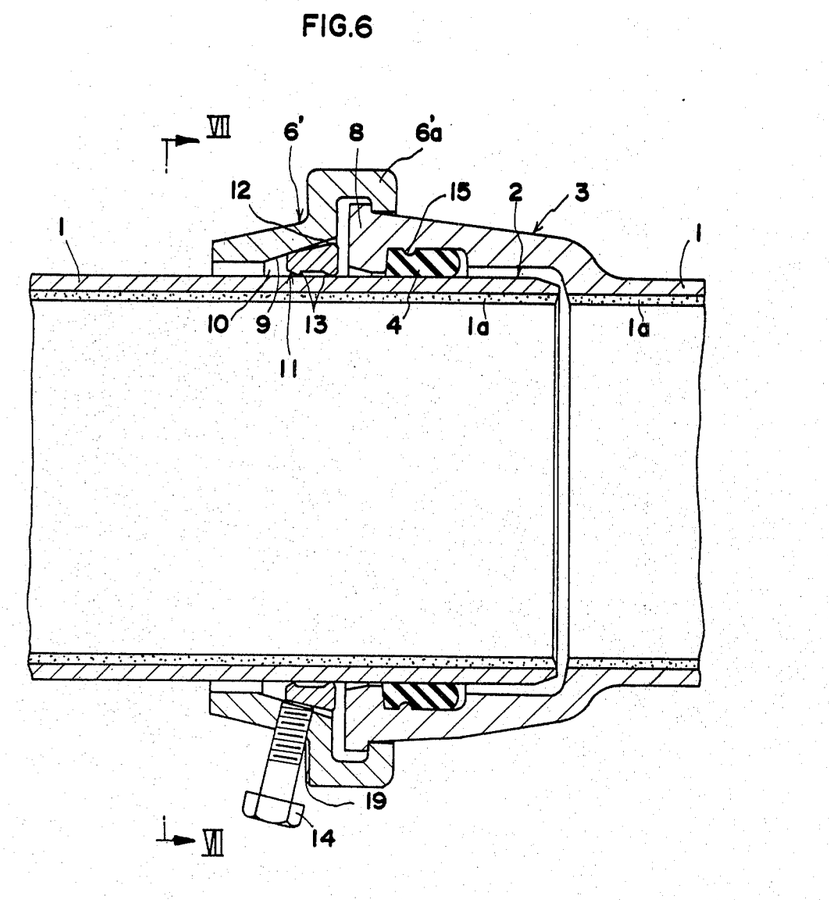
FIG. 6 is a side elevation in longitudinal section showing a second embodiment of the invention.
Figure 7:
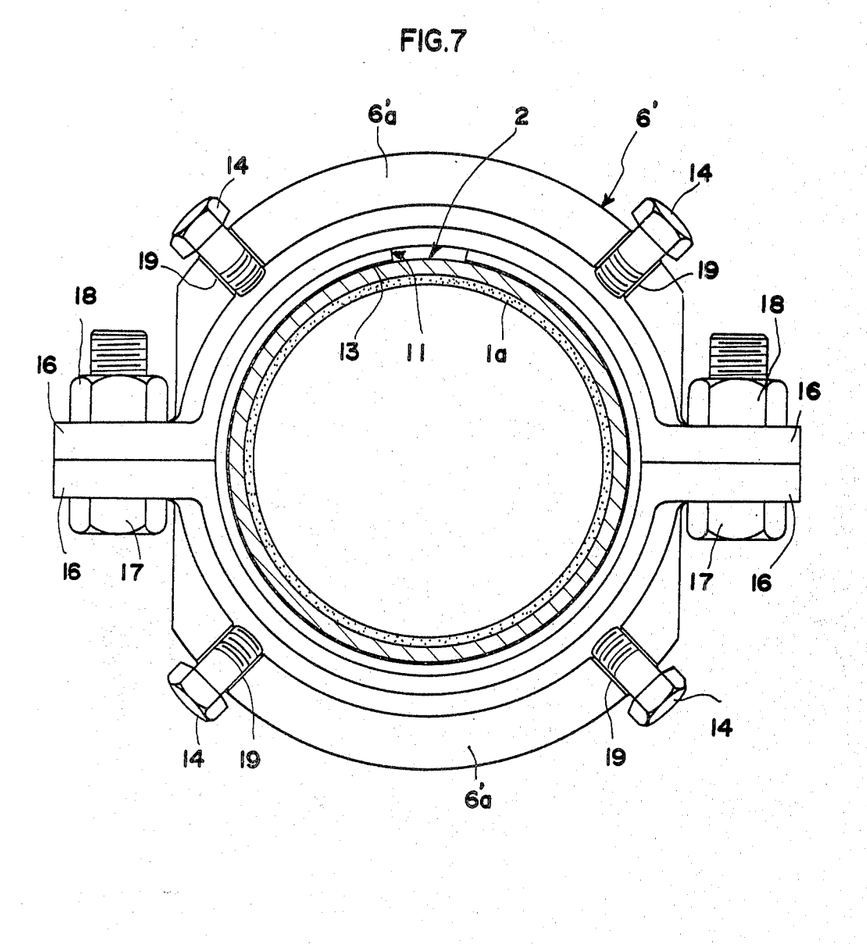
FIG. 7 is a view in section taken along the line VII—VII in FIG. 6.

FIGS. 6 and 7 show a second embodiment of the invention, in which the same parts as included in the first embodiment are referred to by the same corresponding reference numerals. Such parts will not be described.

As shown in FIG. 6, this embodiment has a packing seat 5 positioned at a distance from the end face of the socket 3 and an annular projection 15 for holding an annular packing 4 in position. A stopper 11 is provided with a holding member comprising two semicircular housings 6' each having a connecting flange 16 at each end and connected together in an annular form by bolts 17 and nuts 18. The housing 6' has a hook portion 6'a or radially inwardly extending lip which is engaged with the outer flange 8 of the socket 3, whereby the housing can be installed in place. The housing 6' is partly cut out as at 19 where the housing interferes with tap bolts 14.

Figure 8:
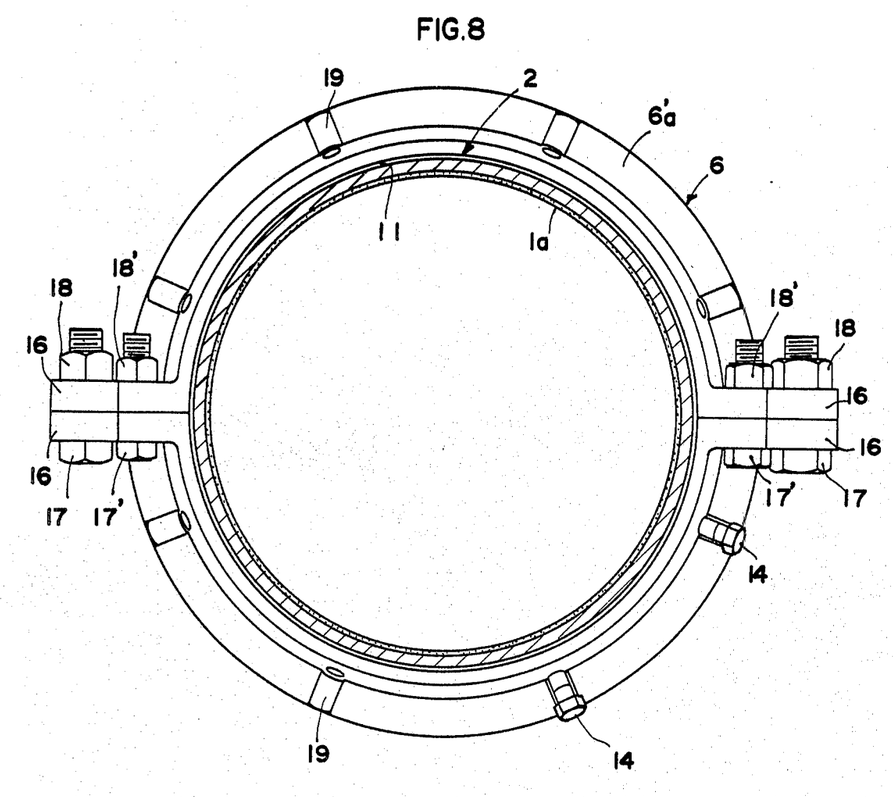
FIG. 8 is a view similar to FIG. 7 and showing a modification of the second embodiment as used for diametrically large pipes.
Figure 9:
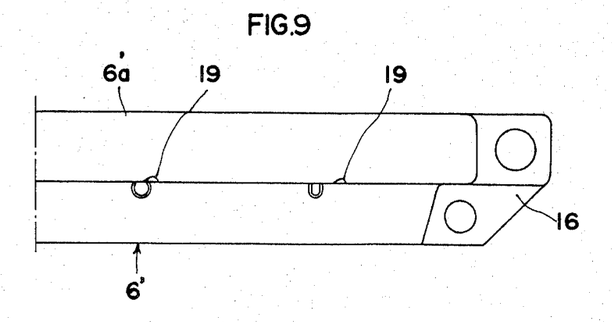
FIG. 9 is a fragmentary plan view of the same.

When the joint is used for pipes 1 of large diameter, an increased number of tap bolts 14 are used as seen in FIGS. 8 and 9. Additional bolts 17' and nuts 18' are employed for fastening the connecting flanges 16 together tightly to prevent separation of the housings 6' when the spigot 2 acts to slip off.

The second embodiment prevents separation on the same principle as the first embodiment.

What is claimed is:

1. A pipe joint for preventing separation wherein an annular packing is provided between a packing seat formed on the inner periphery of a socket and the outer periphery of a spigot, the pipe joint comprising:

a plurality of circular arc housings connected together in the form of an annular ring and surrounding the spigot outer periphery outside the socket, each housing comprising a first portion having a radially inwardly extending lip at one axial end thereof and a radial web at the other axial end thereof remote from the socket end face, and a second portion extending axially from the inner end of said radial web away from the socket end face, said second portion being provided on its inner periphery with a tapered surface increasing in diameter toward the socket end;

an annular outer flange formed on the end of the socket and engageable by said radially inwardly extending lips of the housing first portions;

a stopper in the form of a ring divided at one location and interposed between the inner peripheral tapered surfaces of the housing second portions and the spigot outer periphery immediately inwardly of the radial webs of the housing first portions, said stopper being provided with engaging edge means in a plurality of circumferential rows on its inner periphery and with an outer peripheral tapered surface increasing in diameter toward the socket end and adapted to be in wedging engagement with the inner peripheral tapered surfaces of the housing second portions; and tap bolts extending through the housing second portions for pressing the stopper from outside against the spigot outer periphery, and radial recesses formed on the surfaces of said radial webs of the housing first portions, said radial recesses being opposed to said tap bolts.

2. A pipe joint as defined in claim 1 wherein the engaging edge means are provided in two rows at axially opposite ends of the stopper.

3. A pipe joint as defined in claim 2 wherein each of the engaging edge means comprises an engaging edge continuously extending circumferentially of the stopper.

4. A pipe joint as defined in claim 2 wherein each of the engaging edge means comprises engaging edges formed discretely circumferentially of the stopper.

5. A pipe joint as defined in claim 1 wherein the stopper itself exerts a diametrically constricting force on the spigot outer periphery when installed in place.

6. A pipe joint as defined in claim 1 wherein the circumferentially opposite ends of each housing second portion are each provided with a connecting flange, and each two adjacent connecting flanges are connected together by one or more sets of bolt and nut.

7. A pipe joint as defined in claim 1 wherein each tap bolt has a forward end face parallel to and in surface-to-surface wedging engagement with the outer peripheral tapered surfaces of the stopper.

8. A pipe joint as defined in claim 1 wherein the circumferentially opposite ends of each housing first portion are cut away so that the housing first portions are circumferentially discontinuous when the housings are connected together.

* * * * *

UNITED STATES PATENT AND TRADEMARK OFFICE
CERTIFICATE OF CORRECTION

PATENT NO. : 4,417,754
DATED : November 29, 1983
INVENTOR(S) : TADAO YAMAJI, ET AL.

It is certified that error appears in the above—identified patent and that said Letters Patent is hereby corrected as shown below:

Column 1, line 27, "to" should read --the--.

Column 2, line 48, "hood" should read --hook--.

Column 4, line 10, "as is" should read --as if--.

Signed and Sealed this

Third Day of April 1984

[SEAL]

Attest:

GERALD J. MOSSINGHOFF

Attesting Officer

Commissioner of Patents and Trademarks